Sept. 1, 1925.                    G. T. JOHNSON                    1,552,308
                                 CAR COUPLING DEVICE
                                  Filed July 8. 1924
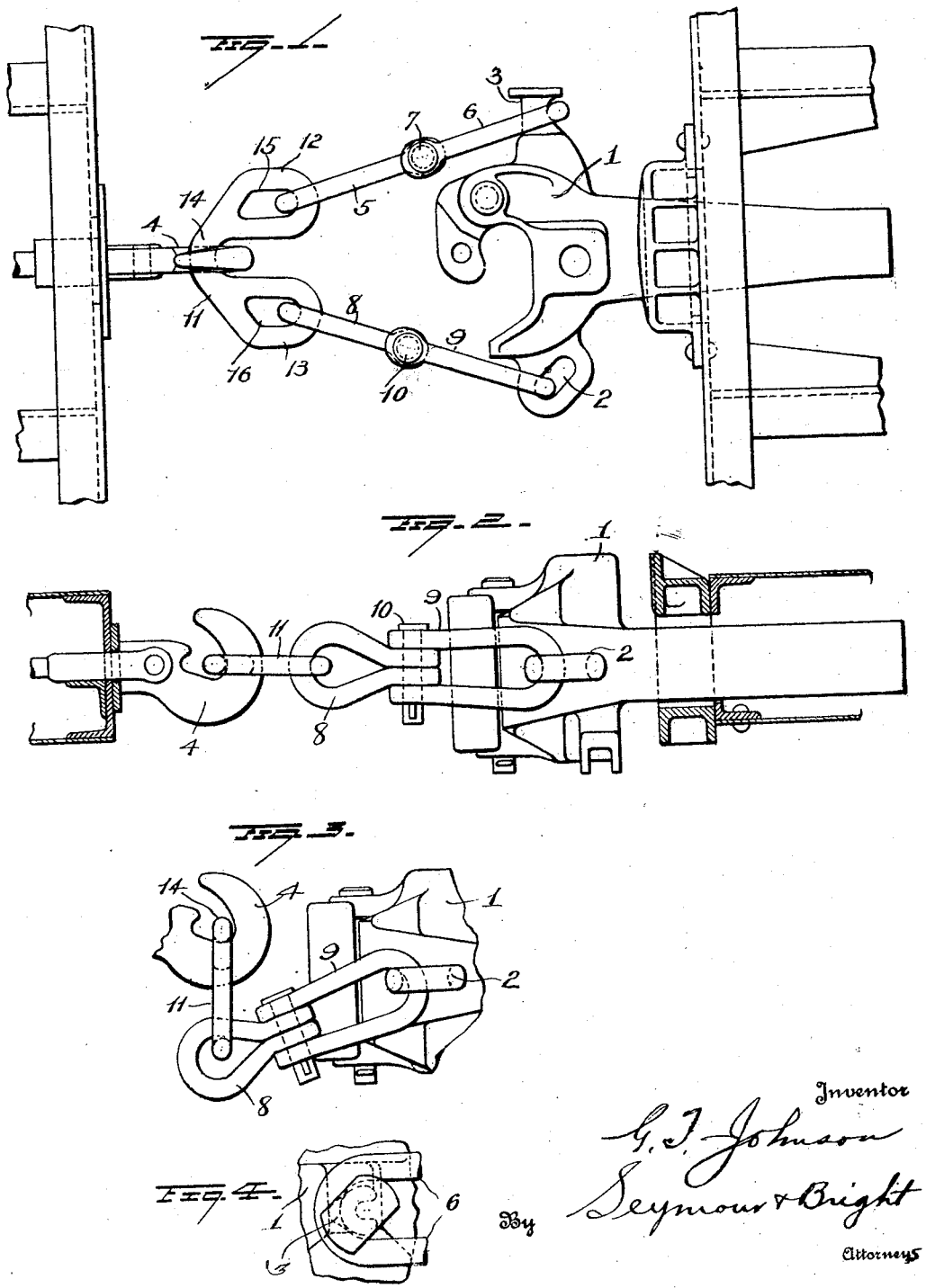

Patented Sept. 1, 1925.

1,552,308

UNITED STATES PATENT OFFICE.

GEORGE TEWKSBURY JOHNSON, OF COLUMBUS, OHIO, ASSIGNOR TO THE BUCKEYE STEEL CASTINGS COMPANY, OF COLUMBUS, OHIO.

CAR-COUPLNG DEVICE.

Application filed July 8, 1924. Serial No. 724,840.

*To all whom it may concern:*

Be it known that I, GEORGE T. JOHNSON, a citizen of the United States, and resident of Columbus, in the county of Franklin and State of Ohio, have invented certain new and useful Improvements in Car-Coupling Devices; and I do hereby declare the following to be a full, clear, and exact description of the invention, such as will enable others skilled in the art to which it appertains to make and use the same.

This invention relates to car coupling devices and particularly to such as are employed for connecting a coupler of the automatic type such as employs a pivoted knuckle, with a coupler of the hook type,— the object of the invention being to provide improved means whereby the connections between the head of the automatic coupler and the hook coupler shall not only accommodate themselves to unequal loading of the cars and will not interfere with the usual operation of the automatic coupler, but so that the ease and accuracy of operation of said connections when the two cars to which the couplers are respectively connected approach each other and the connections assume a position intermediate of the extreme positions of which they are capable of assuming, shall be facilitated.

With this and other objects in view, the invention consists in certain novel features as hereinafter set forth and pointed out in the claims.

In the accompanying drawings,—

Figure 1 is a plan view illustrating an embodiment of the invention, with parts of the connections between the two couplers in positions which they occupy when under pulling strain.

Figure 2 is a side view of the same.

Figure 3 is a view showing positions of parts comprising the connections between the two couplers, which they may assume when the hook coupler approaches the automatic coupler and, Figure 4 is a detail view.

The automatic coupler head 1 is, in the present instance provided on the outer side of the guard arm with an eye 2 preferably slightly elongated and diverging forwardly from the longitudinal axis of the head. On the opposite side of the head and aligned transversely with the center of the eye is a headed stud 3, the head of which is flattened on its opposite side edges whereby it is given a substantially elliptical form with its major axis inclined downwardly and rearwardly, as shown in Figure 4. The connecting devices between the automatic coupler and a hook coupler 4 include shackles 5—6 pivotally connected together by a vertical pivot pin 7 and the shackle 6 made to engage the stud 3 on the automatic coupler head; shackles 8—9 pivotally connected together by a vertical pivot pin 10, the shackle 9 being somewhat longer than the shackle 8 and engaged in the eye 2 on the automatic coupler head, and a hook-eye link 11 for connection with the hook coupler 4.

The link 11 comprises in a single piece parallel members 12—13 and a connecting member 14,—said members 12 and 13 being spaced apart sufficiently to afford ample clearance to permit connection of the intermediate member 14 of said link with the hook coupler 4. The eyes or openings 15—16 in the members 12—13 of the link 11 are of such size and proportions as to permit the threading through them of the shackles 5—8 prior to the connecting of these shackles with the shackles 6—9.

By reason of the employment of the hook eye link 11 constructed and connected in the manner above described with the hook coupler and with the automatic coupler, the ease and accuracy of operation of the parts when the hook coupler approaches the automatic coupler, as during the buffing action between the cars, and the parts assume positions approximately as indicated in Figure 3, will be insured.

Having fully described my invention what I claim as new and desire to secure by Letters-Patent, is:

1. In coupling devices of the type described, the combination with an automatic coupler head, of a hook-eye link for connection with a hook coupler, said link comprising parallel side members having eyes through their ends and an integral substantially V-shaped connecting member adapted to engage with the hook coupler, and series of shackles, each series having a shackle engaged through an eye of said link and another shackle attached to a side of the automatic coupler head.

2. In coupling devices of the type described, the combination with an automatic coupler head, of a hook-eye link for connection with a hook coupler, said link comprising parallel side members having eyes through their ends and an integral substantially V-shaped connecting member adapted to engage with the hook coupler, shackles engaged at their bights through the respective eyes of said hook-eye link, the ends of each shackle being brought together, other shackles having their bights loosely connected with the sides of the automatic coupler head and their ends embracing the ends of the respective alined first-mentioned shackles, and pivots inserted through the embraced and embracing ends of alined shackles to permit relative movement of the shackles in a single plane.

In testimony whereof, I have signed this specification.

GEORGE TEWKSBURY JOHNSON.